United States Patent
Takamori et al.

(10) Patent No.: US 9,112,228 B2
(45) Date of Patent: Aug. 18, 2015

(54) LITHIUM-CONTAINING METAL OXIDE, AND NON-AQUEOUS ELECTROLYTE SECONDARY BATTERY

(75) Inventors: Kenji Takamori, Tsukuba (JP); Yuichiro Imanari, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 97 days.

(21) Appl. No.: 13/499,063

(22) PCT Filed: Sep. 21, 2010

(86) PCT No.: PCT/JP2010/066748
§ 371 (c)(1), (2), (4) Date: Jun. 15, 2012

(87) PCT Pub. No.: WO2011/040379
PCT Pub. Date: Apr. 7, 2011

(65) Prior Publication Data
US 2012/0244411 A1 Sep. 27, 2012

(30) Foreign Application Priority Data
Oct. 2, 2009 (JP) .................................. 2009-230237

(51) Int. Cl.
| | |
|---|---|
| H01M 4/131 | (2010.01) |
| H01M 4/505 | (2010.01) |
| C01G 53/00 | (2006.01) |
| H01M 2/16 | (2006.01) |
| H01M 4/525 | (2010.01) |
| H01M 10/052 | (2010.01) |

(52) U.S. Cl.
CPC ............... H01M 4/505 (2013.01); C01G 53/50 (2013.01); H01M 2/1686 (2013.01); H01M 4/131 (2013.01); H01M 4/525 (2013.01); H01M 10/052 (2013.01); C01P 2002/52 (2013.01); C01P 2004/62 (2013.01); C01P 2006/40 (2013.01); Y02E 60/122 (2013.01); Y02T 10/7011 (2013.01); Y10T 428/2982 (2015.01)

(58) Field of Classification Search
CPC ...................................................... H01M 4/131
USPC ........................... 429/218.1, 223–224, 231.1
See application file for complete search history.

(56) References Cited

U.S. PATENT DOCUMENTS

| | | | |
|---|---|---|---|
| 6,352,794 B1 | 3/2002 | Nakanishi et al. | |
| 2001/0028874 A1* | 10/2001 | Cho et al. ..................... | 423/594 |
| 2002/0110518 A1* | 8/2002 | Okuda et al. ................. | 423/594 |
| 2004/0076882 A1 | 4/2004 | Hosoya et al. | |
| 2009/0212267 A1* | 8/2009 | Dobbs et al. ................. | 252/521.2 |
| 2010/0255374 A1 | 10/2010 | Nemoto et al. | |

FOREIGN PATENT DOCUMENTS

| | | |
|---|---|---|
| CN | 101030640 A | 9/2007 |
| EP | 1 372 202 A1 | 12/2003 |
| JP | 2000-195516 A | 7/2000 |
| JP | 3600051 B2 | 12/2004 |
| JP | 2005-008461 A | 1/2005 |
| JP | 2006-040572 A | 2/2006 |
| JP | 2009-059710 A | 3/2009 |
| JP | 2009-158484 A | 7/2009 |
| JP | 2009158484 A | 7/2009 |
| WO | 03/063275 A1 | 7/2003 |

OTHER PUBLICATIONS

Machine Translation of JP 2005-008461 to Iwakoshi Koushin Jan. 13, 2005.*
First Office Action issued Jul. 12, 2013 in corresponding Chinese Patent Application No. 201080043289.5 with English translation.
Machine generated English translation of JP 2005-008461 A, Jan. 13, 2005, Sony Corp.
Japanese Patent Office, "Office Action," issued in connection with Japanese Patent Application No. 2010-209069, dated Jun. 3, 2014.
Japanese Patent Office, "Decision of Rejection," issued in connection with Japanese Patent Application No. 2010-209069, dated Jan. 20, 2015.

* cited by examiner

*Primary Examiner* — Jonathan G Leong
(74) *Attorney, Agent, or Firm* — Sughrue Mion, PLLC

(57) ABSTRACT

The present invention provides a lithium mixed metal oxide, an electrode and a nonaqueous electrolyte secondary battery. The lithium mixed metal oxide is represented by the following formula (A):

$$Li_x(Mn_{1-(y+z)}Ni_yFe_z)O_2 \quad (A)$$

wherein x is not less than 0.9 and not more than 1.3, y is more than 0.5 and not more than 0.7, and z is more than 0 and not more than 0.1.

6 Claims, No Drawings

LITHIUM-CONTAINING METAL OXIDE, AND NON-AQUEOUS ELECTROLYTE SECONDARY BATTERY

CROSS REFERENCE TO RELATED APPLICATIONS

This application is a National Stage of International Application No. PCT/JP2010/066748 filed Sep. 21, 2010, claiming priority based on Japanese Patent Application No. 2009-230237, filed Oct. 2, 2009, the contents of all of which are incorporated herein by reference in their entirety.

TECHNICAL FIELD

The present invention relates to a lithium mixed metal oxide. More specifically, the invention relates to a lithium mixed metal oxide to be used as a positive electrode active material for a nonaqueous electrolyte secondary battery.

BACKGROUND ART

A lithium mixed metal oxide has been used as a positive electrode active material for a nonaqueous electrolyte secondary battery such as a lithium secondary battery. The lithium secondary battery has already been put into practical use as a small-sized power supply for use in portable telephones, notebook personal computers, etc., and has also been tried to be applied to a middle-sized to large-sized power supply for use in automobiles, power storage, etc.

As a conventional lithium mixed metal oxide, Patent Document 1 has specifically disclosed $Li(Mn_{0.1}Ni_{0.45}Fe_{0.45})O_2$.

PRIOR ART DOCUMENTS

Patent Document

[Patent Document 1]: JP2000-195516A

DISCLOSURE OF THE INVENTION

A nonaqueous electrolyte secondary battery obtained by using the lithium mixed metal oxide above as a positive electrode active material is not considered to be desirable from the viewpoint of discharge capacity. An objective of the present invention is to provide a lithium mixed metal oxide to be desirably used as a positive electrode active material that gives a nonaqueous electrolyte secondary battery having greater discharge capacity.

The present invention provides the following means:
<1> a lithium mixed metal oxide represented by the following formula (A):

$$Li_x(Mn_{1-(y+z)}Ni_yFe_z)O_2 \quad (A)$$

wherein x is not less than 0.9 and not more than 1.3, y is more than 0.5 and not more than 0.7, and z is more than 0 and not more than 0.1;
<2> the lithium mixed metal oxide according to <1>, wherein z is not less than 0.02 and not more than 0.07;
<3> the lithium mixed metal oxide according to <1>, wherein y is more than 0.5 and not more than 0.6;
<4> the lithium mixed metal oxide according to any one of <1> to <3>, which is in the form of particles having an average particle diameter of not less than 0.01 μm and not more than 1 μm;
<5> an electrode comprising the lithium mixed metal oxide according to any one of <1> to <4>;
<6> a nonaqueous electrolyte secondary battery comprising the electrode according to <5> as a positive electrode;
<7> the nonaqueous electrolyte secondary battery according to <6>, further comprising a separator; and
<8> the nonaqueous electrolyte secondary battery according to <7>, wherein the separator is composed of a laminated film in which a heat resistant porous layer and a porous film are stacked on each other.

MODE FOR CARRYING OUT THE INVENTION

Lithium Mixed Metal Oxide

The lithium mixed metal oxide of the present invention is represented by the following formula (A):

$$Li_x(Mn_{1-(y+z)}Ni_yFe_z)O_2 \quad (A)$$

wherein x is not less than 0.9 and not more than 1.3, y is more than 0.5 and not more than 0.7, and z is more than 0 and not more than 0.1.

In the case where x is less than 0.9 and in the case where x is more than 1.3, it is not preferable because the resultant nonaqueous electrolyte secondary battery has smaller capacity. From the viewpoint of further increasing the capacity, x is preferably not less than 0.95 and not more than 1.15.

In the case where y is not more than 0.5, the resultant nonaqueous electrolyte secondary battery is hardly allowed to have greater capacity. In the case where y is more than 0.7, the resultant nonaqueous electrolyte secondary battery tends to have a low cycling characteristic. Therefore, y is preferably not less than 0.5 and not more than 0.6, and more preferably not less than 0.52 and not more than 0.58.

In the case where z is 0, it is not preferable because the cycling characteristic of the resultant nonaqueous electrolyte secondary battery is lowered. In the case where z is more than 0.1, it is not preferable because the capacity of the resultant nonaqueous electrolyte secondary battery becomes smaller. From the viewpoints of achieving both high capacity and a desirable cycling characteristic, in particular, a desirable cycling characteristic during an operation at a high temperature of, for example, 60° C., z is preferably more than 0 and less than 0.1, more preferably not less than 0.01 and not more than 0.09, and furthermore preferably not less than 0.02 and not more than 0.07.

A lithium mixed metal oxide is normally in the form of particles, and composed of primary particles and secondary particles comprising mutually aggregated primary particles. In the present invention, the average particle diameter represents an average particle diameter of the entire particles composed of primary particles and secondary particles comprising mutually aggregated primary particles. The average particle diameter corresponds to a value of $D_{50}$ on a volume basis obtained by laser diffraction scattering particle-size distribution measurements on the entire particles forming a lithium mixed metal oxide. The value of $D_{50}$ corresponds to a particle diameter at 50% accumulation measured from the finest particle side obtained from an accumulative particle-size distribution curve on a volume basis. As a laser diffraction scattering particle-size distribution measuring apparatus, a Mastersizer 2000 manufactured by Malvern Instruments Ltd. may be used. The lithium mixed metal oxide of the present invention is preferably in the form of particles having an average particle diameter of not less than 0.01 μm and not more than 1 μm, and more preferably in the form of particles having an average particle diameter of not less than 0.05 μm and not more than 0.8 μm. The lithium mixed metal oxide of the present invention preferably has a BET specific surface area of not less than 3 m²/g and not more than 20 m²/g.

From the viewpoint of obtaining a nonaqueous electrolyte secondary battery having high output and superior cycling characteristics, the lithium mixed metal oxide of the present invention preferably has an average primary particle diameter of not less than 0.01 µm and not more than 0.5 µm, and more preferably has an average primary particle diameter of not less than 0.05 µm and not more than 0.3 µm. The average primary particle diameter is determined by observing primary particles forming a lithium mixed metal oxide using a scanning electron microscope (hereinafter, sometimes referred to as SEM). As the scanning electron microscope, JSM-5510 manufactured by Nippon Denshi Co., Ltd. may be used.

From the viewpoint of further enhancing the effects of the present invention, the lithium mixed metal oxide of the present invention preferably has an α-NaFeO$_2$-type crystal structure, that is, a crystal structure belonging to the R-3m space group. The crystal structure can be identified from a powder X-ray diffraction pattern obtained by powder X-ray diffraction measurements of the lithium mixed metal oxide in which CuKα is used as a radiation source.

Within a range not impairing the effects of the present invention, a portion of Li, Ni, Mn and Fe of the lithium mixed metal oxide of the present invention may be substituted with other elements. Examples of the other elements include B, Al, Ga, In, Si, Ge, Sn, Mg, Sc, Y, Zr, Hf, Nb, Ta, Cr, Mo, W, Ru, Rh, Ir, Pd, Cu, Ag, Zn, Ca, and V.

<Method for Producing Lithium Mixed Metal Oxide>

The following description will discuss a method for producing the lithium mixed metal oxide of the present invention. The lithium mixed metal oxide of the present invention can be produced by calcining a lithium mixed metal oxide raw material containing prescribed elements at a prescribed molar ratio. The lithium mixed metal oxide raw material is preferably produced as a mixture between a lithium compound and a transition metal compound of Mn, Ni and Fe. Examples of the transition metal compound of Mn, Ni and Fe include a mixture of respective metal compounds of Mn, Ni and Fe. Examples of the metal compound include respective oxides, hydroxides (hydroxides include oxyhydroxides, and the same shall apply hereinafter), chlorides, carbonates, sulfates, nitrates, oxalates, acetates of Mn, Ni and Fe, and hydroxides thereof are preferable. The metal compound may be a compound containing two or more kinds of elements among Mn, Ni and Fe. The compound can be obtained by coprecipitation, and is preferably a hydroxide containing two or more kinds of elements selected from the group consisting of Mn, Ni and Fe. The transition metal compound is more preferably a hydroxide containing Mn, Ni and Fe. Examples of the lithium compound include one or more kinds of compounds selected from the group consisting of lithium hydroxide, lithium chloride, lithium nitrate and lithium carbonate. These lithium compounds may be either anhydrides, or hydrates. Among these lithium compounds, lithium hydroxides, lithium carbonates, or both of these are preferably used. A method of mixing the lithium compound and the transition metal compound of Mn, Ni and Fe may be either a dry mixing method or a wet mixing method, and from the viewpoint of convenience, the dry mixing method is preferably used. Examples of a mixing apparatus include a stirring mixer, a V-type mixer, a W-type mixer, a ribbon mixer, a drum mixer, and a ball mill.

Next, the lithium mixed metal oxide raw material is calcined. Prior to the calcination, the raw material may be mixed with an inactive flux, if necessary. The inactive flux is preferably a material that hardly reacts with the lithium mixed metal oxide raw material at the time of the calcination. Preferable examples of the inactive flux include chlorides such as NaCl, KCl and NH$_4$Cl; carbonates such as K$_2$CO$_3$ and Na$_2$CO$_3$; fluorides such as NaF, KF and NH$_4$F; and borates, and chlorides and carbonates are more preferable. By calcining a mixture of the raw material and the inactive flux, the reactivity of the raw material may be controlled so that the average particle diameter and BET specific surface area of the resultant lithium mixed metal oxide may be adjusted in some cases. Two or more kinds of the inactive fluxes may be used in combination. The inactive flux may be left in the lithium mixed metal oxide after the calcination, or may be removed therefrom by washing the lithium mixed metal oxide after the calcination or by evaporation or the like of the reaction accelerator.

The calcination temperature is an important factor from the viewpoint of adjusting the average particle diameter and BET specific surface area of the lithium mixed metal oxide. Normally, as the calcination temperature becomes higher, the average particle diameter tends to become larger and the BET specific surface area tends to become smaller. As the calcination temperature becomes lower, the average particle diameter tends to become smaller and the BET specific surface area tends to become larger. The calcination temperature is preferably not less than 650° C. and not more than 1000° C. The period of time for which the calcination temperature is kept is normally 0.1 hour to 20 hours, and preferably 0.5 hours to 8 hours. The temperature-rising rate up to the calcination temperature is normally 50° C./hour to 400° C./hour, and the temperature-lowering rate down to room temperature from the calcination temperature is normally 10° C./hour to 400° C./hour. Examples of a calcination atmosphere include atmospheric air, oxygen, nitrogen, argon and a mixed gas thereof, and the atmospheric air is preferable.

The resultant lithium mixed metal oxide after the calcination may be pulverized using a ball mill, a jet mill, or the like. By the pulverization, the BET specific surface area of the lithium mixed metal oxide may be adjusted in some cases. The pulverization and the calcination may be repeated two or more times, respectively. The lithium mixed metal oxide may be washed or classified, if necessary.

Within a range without drastically impairing the effects of the present invention, a compound different from the lithium mixed metal oxide may adhere to the surface of each of particles forming the lithium mixed metal oxide of the present invention.

The lithium mixed metal oxide of the present invention is effectively used for a nonaqueous electrolyte secondary battery having high capacity.

The lithium mixed metal oxide of the present invention functions as a positive electrode active material in a nonaqueous electrolyte secondary battery.

<Electrode Having Lithium Mixed Metal Oxide; Positive Electrode>

The following description will discuss a method of producing an electrode using the lithium mixed metal oxide. The resultant electrode is desirably used as a positive electrode in a nonaqueous electrolyte secondary battery. Next, examples of producing an electrode having a lithium mixed metal oxide, that is, a positive electrode, will be described.

The positive electrode is produced by supporting a positive electrode mixture including a positive electrode active material (lithium mixed metal oxide), a conductive material and a binder onto a positive electrode collector. Examples of the conductive material include carbonaceous materials. Examples of the carbonaceous material include a graphite powder, carbon black, acetylene black, and a fiber-state carbonaceous material. Carbon black or acetylene black is in the form of fine particles with a large surface area. When a small amount of carbon black or acetylene black is added to the positive electrode mixture, the conductivity inside the positive electrode becomes higher so that the charging/discharging efficiency and rate characteristic of a secondary battery are improved. However, in the case where too much of carbon black or acetylene black is added to the positive electrode mixture, the bonding property of the binder, which is exerted between the positive electrode mixture and the positive electrode collector, is lowered, resulting in an increase in resistivity inside the positive electrode. The ratio of the conductive material in the positive electrode mixture is normally not less than 5 parts by weight and not more than 20 parts by weight relative to 100 parts by weight of the positive electrode active material. When the conductive material is a fiber-state carbonaceous material such as a graphitized carbon fiber or a carbon nanotube, this ratio can be lowered.

Examples of the binder include thermoplastic resins, and specific examples of the thermoplastic resin include fluorine resins such as polyvinylidene fluoride (hereinafter, sometimes referred to as PVdF), polytetrafluoroethylene (hereinafter, sometimes referred to as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene. Two or more kinds of these may be mixed with one another and used. A fluorine resin and a polyolefin resin may be used as the binder, and by allowing the positive electrode mixture to contain these resins so as to have a ratio of the fluorine resin in a range from 1% by weight to 10% by weight as well as a ratio of the polyolefin resin in a range from 0.1% by weight to 2% by weight relative to the positive electrode mixture, a positive electrode mixture having a superior bonding property to the positive electrode collector can be obtained.

Examples of the positive electrode collector include Al, Ni, and stainless, and Al is preferably used from the viewpoints of being easily formed into a thin film and of low costs. Examples of a method of supporting the positive electrode mixture on the positive electrode collector include a pressure molding method and a method in which a positive electrode mixture paste is obtained by further using an organic solvent or the like, and then the paste is applied to the positive electrode collector, followed by drying, and the resulting sheet is pressed so that the positive electrode mixture is anchored to the collector. The paste contains a positive electrode active material, a conductive material, a binder and an organic solvent. Examples of the organic solvent include amine-based solvents such as N,N-dimethylaminopropylamine and diethylenetriamine, ether-based solvents such as tetrahydrofuran, ketone-based solvents such as methylethyl ketone, ester-based solvents such as methyl acetate, and amide-based solvents such as dimethyl acetoamide and N-methyl-2-pyrrolidone (hereinafter, sometimes referred to as NMP).

Examples of a method of applying the positive electrode mixture paste onto the positive electrode collector include a slit-die coating method, a screen coating method, a curtain coating method, a knife coating method, a gravure coating method, and an electrostatic spraying method. By using the processes as described above, a positive electrode can be manufactured.

<Nonaqueous Electrolyte Secondary Battery>

Next, as a method for producing a nonaqueous electrolyte secondary battery having the above-mentioned positive electrode, examples of producing a lithium secondary battery will be described. The lithium secondary battery can be produced through processes in which an electrode group obtained by stacking or stacking and winding a separator, a negative electrode, a separator and the above-mentioned positive electrode, is housed in a battery case such as a battery can, and an electrolytic solution is injected into the case.

Examples of the shape of the group of electrodes include shapes having a cross section such as a circular shape, an elliptical shape, a rectangular shape or a rectangular shape with round corners, when the group of electrodes was cut in the direction perpendicular to the axis of winding of the group of electrodes. Examples of the shape of the battery include a paper shape, a coin shape, a cylinder shape, and a rectangular shape.

<Negative Electrode for Nonaqueous Electrolyte Secondary Battery>

The negative electrode can be doped and dedoped with the lithium ions at a potential lower than that of the positive electrode. Examples of the negative electrode include an electrode formed by supporting a negative electrode mixture containing a negative electrode material on a negative electrode collector, or an electrode comprised of solely a negative electrode material. Examples of the negative electrode material include materials such as a carbonaceous material, a chalcogen compound (an oxide, a sulfide, etc.), a nitride, metal and an alloy, which can be doped and dedoped with lithium ions at a potential lower than that of the positive electrode. These negative electrode materials may be mixed and used.

The negative electrode material is exemplified in the following materials. Specific examples of the carbonaceous material include graphites such natural graphite and artificial graphite, cokes, carbon black, thermally decomposable carbons, carbon fibers, and calcined polymeric materials. Specific examples of the oxide include oxides of silicon represented by the formula $SiO_x$, (wherein x is a positive real number) such as $SiO_2$ and SiO, oxides of titanium represented by the formula $TiO_x$, (wherein x is a positive real number) such as $TiO_2$ and TiO, oxides of vanadium represented by the formula $VO_x$, (wherein x is a positive real number) such as $V_2O_5$ and $VO_2$, oxides of iron represented by the formula $FeO_x$, (wherein x is a positive real number) such as $Fe_3O_4$, $Fe_2O_3$ and FeO, oxides of tin represented by the formula $SnO_x$, (wherein x is a positive real number) such as $SnO_2$ and SnO, oxides of tungsten represented by the general formula $WO_x$, (wherein x is a positive real number) such as $WO_3$ and $WO_2$, and mixed metal oxides containing lithium and titanium and/or vanadium such as $Li_4Ti_5O_{12}$ and $LiVO_2$ (including $Li_{1.1}V_{0.9}O_2$). Specific examples of the sulfide include sulfides of titanium represented by the formula $TiS_x$, (wherein x is a positive real number) such as $Ti_2S_3$, $TiS_2$ and TiS, sulfides of vanadium represented by the formula $VS_x$, (wherein x is a positive real number) such as $V_3S_4$, $VS_2$ and VS, sulfides of iron represented by the formula $FeS_x$, (wherein x is a positive real number) such as $Fe_3S_4$, $FeS_2$ and FeS, sulfides of molybdenum represented by the formula $MoS_x$ (wherein x is a positive real number) such as $Mo_2S_3$ and $MoS_2$, sulfides of tin represented by the formula $SnS_x$ (wherein x is a positive real number) such as $SnS_2$ and SnS, sulfides of tungsten represented by the formula $WS_x$ (wherein x is a positive real number) such as $WS_2$, sulfides of antimony represented by the formula $SbS_x$ (wherein x is a positive real number) such as $Sb_2S_3$, and sulfides of selenium represented by the formula $SeS_x$ (wherein x is a positive real number) such as $Se_5S_3$, $SeS_2$ and SeS. Specific examples of the nitride include lithium-containing nitrides such as $Li_3N$ and $Li_{3-x}A_xN$ (wherein A represents Ni and/or Co, and 0<x<3 is satisfied). Two or more kinds of these carbonaceous materials, oxides, sulfides and nitrides may be used in combination. These materials may be crystalline or amorphous. Each of these carbonaceous materials, oxides, sulfides and nitrides is mainly supported on a negative electrode collector, and used as an electrode.

Specific examples of the metal include lithium metal, silicon metal and tin metal. Specific examples of the alloy include lithium alloys such as Li—Al, Li—Ni and Li—Si, silicon alloys such as Si—Zn, tin alloys such as Sn—Mn, Sn—Co, Sn—Ni, Sn—Cu and Sn—La, and other alloys such as $Cu_2Sb$ and $La_3Ni_2Sn_7$. Each of these metals and alloys is mainly used solely as an electrode (for example, as a foil).

From the viewpoints of high potential flatness, low average discharging potential and good cycling characteristics of the resultant secondary battery, the negative electrode material is preferably a carbonaceous material mainly composed of graphite such as natural graphite or artificial graphite. Examples of the shape of the carbonaceous material include a flaky shape such as natural graphite, a spherical shape such as meso-carbon microbeads, a fiber shape such as graphitized carbon fibers, and an aggregate of fine powders.

The negative electrode mixture may contain a binder, if necessary. Examples of the binder include thermoplastic resins. Specific examples of the thermoplastic resin include PVdF, thermoplastic polyimide, carboxymethyl cellulose, polyethylene, and polypropylene.

Examples of the negative electrode collector include Cu, Ni, and stainless, and from the viewpoints of hardly forming an alloy with lithium and of being easily processed into a thin film, Cu is preferably used. Examples of a method of supporting the negative electrode mixture onto the negative electrode collector include the same methods as those of the positive electrode, that is, a pressure molding method and a method in which a negative electrode mixture paste is obtained by further using a solvent or the like, and then the paste is applied to the negative electrode collector, followed by drying, and the resulting sheet is pressed so that the negative electrode mixture is anchored to the collector.

<Separator for Nonaqueous Electrolyte Secondary Battery>

Examples of the separator include members having various material modes such as a porous film, a nonwoven cloth, and a woven cloth, which are made from materials such as polyolefin resins including polyethylene and polypropylene, fluorine resins, and nitrogen-containing aromatic copolymers. The separator may be made from two or more kinds of the above-mentioned materials, or may be a laminated separator in which the above-mentioned members are stacked. Examples of the separator include those separators disclosed in, for example, JP-A Nos. 2000-30686 and 10-324758. From the viewpoint of increasing the volume energy of the battery with a reduction in inner resistance, the thickness of the separator is normally about from 5 to 200 µm, and preferably about from 5 to 40 µm. The separator is preferably made as thin as possible, as long as its mechanical strength can be maintained.

The separator preferably includes a porous film containing a thermoplastic resin. In a nonaqueous electrolyte secondary battery, the separator is disposed between the positive electrode and the negative electrode. The separator preferably has such a function that, when an abnormal current flows in a battery due to a short circuit or the like between positive and negative electrodes, it interrupts the current to prevent an excessive current from flowing therethrough (shutdown). In this case, the shutdown is carried out by clogging the fine pores of the porous film in the separator when the normally used temperature is exceeded. Even when, after the shutdown, the temperature inside the battery rises to a certain degree of high temperature, the shutdown state is preferably maintained without being film-ruptured by the temperature.

Examples of such a separator include laminated films in which a heat resistant porous layer and a porous film are stacked on each other. By using the film as the separator, the heat resistant property of the secondary battery is further improved. The heat resistant porous layers may be stacked on the two surfaces of the porous film.

The following description will discuss the laminated film in which the heat resistant porous layer and the porous film are stacked on each other.

In the laminated film, the heat resistant porous layer is a layer having a heat resistant property higher than that of the porous film, and the heat resistant porous layer may be formed from an inorganic powder, or may contain a heat resistant resin. By allowing the heat resistant porous layer to contain a heat resistant resin, it is possible to form a heat resistant porous layer by using an easy procedure such as coating. Examples of the heat resistant resin include polyamide, polyimide, polyamideimide, polycarbonate, polyacetal, polysulfone, polyphenylene sulfide, polyetherketone, aromatic polyester, polyether sulfone and polyether imide, and from the viewpoint of further improving the heat resistant property, polyamide, polyimide, polyamideimide, polyether sulfone and polyether imide are preferable, and more preferably, polyamide, polyimide and polyamideimide, furthermore preferably, nitrogen-containing aromatic polymers such as aromatic polyamides (para-oriented aromatic polyamides, meta-oriented aromatic polyamides), aromatic polyimides, and aromatic polyamideimides, and still furthermore preferably aromatic polyamides, and from the viewpoint of production, particularly preferably para-oriented aromatic polyamides (hereinafter, sometimes referred to as "para-aramide"). Moreover, examples of the heat resistant resin include poly-4-methylpentene-1 and cyclic olefin-based polymers. By using these heat resistant resins, the heat resistant property of the laminated film, that is, the thermal film-rupturing temperature of the laminated film can be improved. In the case where, among these heat resistant resins, the nitrogen-containing aromatic polymer is used, good compatibility with an electrolytic solution may be sometimes exerted because of the polarity inside its molecule, and in such a case, the liquid-holding property of the electrolytic solution in the heat resistant porous layer is improved. Thus, upon production of a nonaqueous electrolyte secondary battery, the injecting rate of the electrolytic solution becomes faster, and the charging/discharge capacity of the nonaqueous electrolyte secondary battery is also increased.

The thermal film-rupturing temperature of the laminated film depends on the kind of the heat resistant resin, and is selected and used in accordance with the application state and application purpose. More specifically, in the case where the nitrogen-containing aromatic polymer is used as the heat resistant resin, the thermal film-rupturing temperature can be controlled to about 400° C., in the case where poly-4-methylpentene-1 is used, it can be controlled to about 250° C., and in the case where a cyclic olefin-based polymer is used, it can be controlled to about 300° C., respectively. In the case where the heat resistant porous layer is made from an inorganic powder, the thermal film-rupturing temperature can be controlled to, for example, not less than 500° C.

The para-amide can be obtained by condensation polymerization between a para-oriented aromatic diamine and a para-oriented aromatic dicarboxylic acid halide, and its amide bonds are virtually composed of repeating units bonded at the para position or corresponding oriented position of an aromatic ring (for example, an oriented position extending coaxially in the opposite direction or in parallel therewith, such as 4,4'-biphenylene, 1,5-naphthalene, and 2,6-naphthalene). Specific examples thereof include para-aramides having a para-oriented structure or a structure corresponding to the para-oriented type such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6 naphthalene dicarboxylic acid amide), poly(2-chloro-paraphenylene terephthalamide), and paraphenylene terephthalamide/2,6-dichloroparaphenylene terephthalamide copolymers.

The aromatic polyimide is preferably a total aromatic polyimide produced by condensation polymerization between an aromatic dianhydride and a diamine. Specific examples of the dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane and 3,3',4,4'-biphenyltetracarboxylic dianhydride. Specific examples of the diamine include oxydianiline, paraphenylene diamine, benzophenone diamine, 3,3'-methylene dianiline, 3,3'-diaminobenzophenone, 3,3'-diaminodiphenyl sulfone and 1,5-naphthalene diamine. Moreover, a polyimide that is soluble to a solvent is desirably used. Examples of the polyimide include a polyimide of a polycondensation product between 3,3',4,4'-diphenylsulfonetetracarboxylic dianhydride and an aromatic diamine.

Examples of the aromatic polyamideimide include a condensation polymerization product between an aromatic dicarboxylic acid and an aromatic diisocyanate, and a condensation polymerization product between an aromatic dianhydride and an aromatic diisocyanate. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate, and m-xylene diisocyanate.

From the viewpoint of improving the ion permeability, the thickness of the heat resistant porous layer is desirably made thinner, and specifically, it is preferably not less than 1 μm and not more than 10 μm, more preferably not less than 1 μm and not more than 5 μm, and particularly preferably not less than 1 μm and not more than 4 μm. The heat resistant porous layer has fine pores, and the size (diameter) of each pore is normally not more than 3 μm, and preferably not more than 1 μm. In the case where the heat resistant porous layer contains a heat resistant resin, the heat resistant porous layer may contain a filler, which will be described later.

The porous film in the laminated film has fine pores. The porous film is preferably provided with a shutdown function, and in this case, it contains a thermoplastic resin. The size (diameter) of each fine pore of the porous film is normally not more than 3 μm, and preferably not more than 1 μm. The rate of porosity of the porous film is normally 30 to 80% by volume, and preferably 40 to 70% by volume. In the case where a nonaqueous electrolyte secondary battery is used at a temperature exceeding a normally used temperature, the porous film is allowed to clog the fine pores by softening the thermoplastic resin forming the film.

As the thermoplastic resin, a resin that is not dissolved in an electrolytic solution in the nonaqueous electrolyte secondary battery is selected. Specific examples of the thermoplastic resin include polyolefin resins such as polyethylene and polypropylene, and a thermoplastic polyurethane resin, and two or more kinds of the thermoplastic resins may be mixed and used. From the viewpoint of being softened at a lower temperature to cause shutdown, the porous film preferably contains a polyethylene. Specific examples of the polyethylene include a low-density polyethylene, a high-density polyethylene and a linear polyethylene, and an ultra-high molecular weight polyethylene having a molecular weight of not less than 1,000,000. From the viewpoint of further increasing the piercing strength of the porous film, the porous film preferably contains an ultra-high molecular weight polyethylene. In order to easily produce the porous film, the thermoplastic resin may be preferably allowed to contain a wax made from polyolefin having a low molecular weight (weight-average molecular weight of not more than 10,000) in some cases.

The thickness of the porous film in the laminated film is normally 3 to 30 μm, preferably 3 to 25 μm, and more preferably 3 to 19 μm. The thickness of the laminated film is normally not more than 40 μm, preferably not more than 30 μm, and more preferably not more than 20 μm. Assuming that the thickness of the heat resistant porous layer is A (μm), and that the thickness of the porous film is B (μm), the value of A/B is preferably not less than 0.1 and not more than 1.

In the case where the heat resistant porous layer contains a heat resistant resin, the heat resistant porous layer may contain one or more kinds of fillers. The material for the filler may be one or more kinds of materials selected from among a organic powder, an inorganic powder and a mixture thereof. Particles forming the filler preferably have an average particle diameter of not less than 0.01 μm and not more than 1 μm.

Examples of the organic powder include powders made from organic substances such as a single material or a copolymer of two or more kinds of materials including styrene, vinyl ketone, acrylonitrile, methylmethacrylate, ethylmethacrylate, glycidyl methacrylate, glycidyl acrylate and methylacrylate; fluorine resins such as polytetrafluoroethylene, a tetrafluoroethylene-hexafluoropropylene copolymer, a tetrafluoroethylene-ethylene copolymer, and polyvinylidene fluoride; melamine resins; urea resins; polyolefins; and polymethacrylates. Each of these organic powders may be used solely, or two or more kinds thereof may be mixed and used. Among these organic powders, from the viewpoint of chemical stability, a polytetrafluoroethylene powder is preferable.

Examples of the inorganic powder include powders made from inorganic substances such as metal oxides, metal nitrides, metal carbides, metal hydroxides, carbonates, and sulfates. Among these, powders made from inorganic substances having low conductivity are preferable. Specific examples of the preferable inorganic powder include powders made from alumina, silica, titanium dioxide, and calcium carbonate. Each of these inorganic powders may be used solely, or two or more kinds thereof may be mixed and used. Among these inorganic powders, from the viewpoint of chemical stability, an alumina powder is preferable. More preferably, all the particles forming the alumina powder are composed of alumina particles, and furthermore preferably, all the particles forming the filler are alumina particles, with a portion or all of the alumina particles being formed into virtually spherical shapes. In the case where the heat resistant porous layer is made from inorganic powder, the above-exemplified inorganic powder may be used, and may also be mixed with a binder, if necessary, and used.

In the case where the heat resistant porous layer contains a heat resistant resin, the content of the filler is dependent on the specific gravity of the filler material. For example, when all the particles forming the filler are made of alumina particles, the content of the filler is normally not less than 5 and not more than 95, preferably not less than 20 and not more than 95, and more preferably not less than 30 and not more than 90 based on the total weight 100 of the heat resistant porous layer. These ranges can be appropriately determined depending on the specific gravity of the filler material.

Examples of the filler shape include a virtually spherical shape, a plate shape, a pillar shape, a needle shape, a whisker shape, and a fiber shape, and from the viewpoint of easily forming uniform pores, a virtually spherical shape is preferable. Examples of the virtually spherical particles include particles having an aspect ratio (major axis of particles/minor axis of particles) of particles of not less than 1 and not more than 1.5. The aspect ratio of the particles can be measured by using an electron microscope photograph.

From the viewpoint of the ion permeability of a secondary battery, the separator is preferably provided with a gas permeability measured by a Gurley method of 50 to 300 seconds/100 ccs, and more preferably 50 to 200 seconds/100 ccs. The rate of porosity of the separator is normally 30 to 80% by volume, and more preferably 40 to 70% by volume. The separator may be formed by stacking separators having different porosities.

<Electrolytic Solution or Solid-State Electrolyte for Nonaqueous Electrolyte Secondary Battery>

An electrolytic solution normally contains an electrolyte and an organic solvent. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_6)_2$, $LiN(SO_2CF_3)(COCF_3)$, $Li(C_4F_9SO_3)$, $LiC(SO_2CF_3)_3$, $Li_2B_{10}Cl_{10}$, LiBOB (in this case, BOB represents bis(oxalato)borate), lithium salt of lower aliphatic carboxylic acid, and $LiAlCl_4$, and two or more kinds of the electrolytes may be mixed and used. Normally, among these, one or more kinds of fluorine-containing lithium salts selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ are used.

In the electrolytic solution, examples of the organic solvent include carbonates such as propylene carbonate, ethylene carbonate (hereinafter, sometimes referred to as EC), dimethyl carbonate (hereinafter, sometimes referred to as DMC), diethyl carbonate, ethylmethyl carbonate (hereinafter, sometimes referred to as EMC), 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methylether, 2,2,3,3-tetrafluoropropyl difluoromethylether, tetrahydrofuran and 2-methyl tetrahydrofuran; esters such as methyl formate, methyl acetate and γ-butyrolactone; nitriles such as acetonitrile and butyronitrile; amides such as N,N-dimethylformamide and N,N-dimethylacetoamide; carbamates such as 3-methyl-2-oxazolidone; sulfur-containing compounds such as sulforan, dimethylsulfoxide and 1,3-propane sultone; and those solvents formed by further introducing a fluorine substituent to the above-mentioned organic solvents. Normally, a mixed solvent obtained by mixing two or more kinds of organic solvents among these solvents is used. Among these, a mixed solvent containing carbonates is preferable, and a mixed solvent of a cyclic carbonate and an acyclic carbonate, or a mixed solvent of a cyclic carbonate and ethers is more preferable. As the mixed solvent of a cyclic carbonate and an acyclic carbonate, a mixed solvent containing EC, DMC and EMC is preferable from the viewpoints of providing a wide operating temperature range, an superior load characteristic and a hardly-decomposing property even in the case of using a graphite material such as natural graphite or artificial graphite as a negative electrode active material. In particular, from the viewpoint of obtaining a superior safety improving effect, an electrolytic solution containing an organic solvent having a fluorine-containing lithium salt such as $LiPF_6$, and a fluorine substituent is preferably used. A mixed solvent containing ethers having a fluorine substituent such as pentafluoropropyl methyl ether and 2,2,3,3-tetrafluoropropyl difluoromethyl ether and DMC is superior in a large-current discharging characteristic, and it is more preferable.

In place of the electrolytic solution, a solid-state electrolyte may be used. As the solid-state electrolyte, for example, an organic polymer electrolyte such as a polyethylene oxide-based polymer or a polymer containing at least one kind of a polyorgano siloxane chain and a polyoxyalkylene chain may be used. A so-called gel-type electrolyte formed by allowing a polymer to support an electrolytic solution may also be used. An inorganic solid-state electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ or $Li_2S$—$SiS_2$—$Li_2SO_4$ may be used. By using these solid-state electrolytes, higher safety may be further ensured in some cases. In the nonaqueous electrolyte secondary battery of the present invention, in the case of using a solid-state electrolyte, the solid-state electrolyte may serve as a separator in some cases, and in this case, no separator may be required in some cases.

EXAMPLES

The following description will further discuss the present invention in detail by means of examples. Evaluations of a lithium mixed metal oxide (positive electrode active material) and charging/discharging tests of a secondary battery were carried out as follows.

(1) Manufacture of Positive Electrode

A material obtained by mixing acetylene black and graphite at a ratio of 9:1 was used as a conductive material. PVdF was used as a binder, and a solution of PVdF in NMP was used as a binder solution. A positive electrode active material and the conductive material were mixed so as to provide composition of positive electrode active material:conductive material:binder=86:10:4 (weight ratio), and the binder solution was added thereto, and kneaded therewith so that a positive electrode mixture paste was obtained. An Al foil having a thickness of 40 μm to be formed into a collector was coated with the paste so that a sheet was obtained, and this sheet was vacuum dried in the condition of 150° C. for 8 hours to obtain a positive electrode.

(2-1) Manufacture of Nonaqueous Electrolyte Secondary Battery (Coin Cell)

As a separator, a laminated film (thickness: 16 μm) formed by stacking a heat resistant porous layer on a polyethylene porous film to be described later was used. As a solvent for an electrolytic solution, a mixed solvent of EC:DMC:EMC=30:35:35 (volume ratio) was used. As an electrolyte, $LiPF_6$ was used. The electrolyte was dissolved in the mixed solvent at a rate of 1 mole/liter so that an electrolytic solution 1 was prepared. Metal lithium was used as a negative electrode. The positive electrode was placed on the lower lid of a coin cell (manufactured by Hohsen Corporation) with its aluminum foil surface facing down, and the separator was placed thereon, and then the electrolytic solution 1 (300 μl) was injected thereto. Next, the negative electrode is put on the upper side of the separator, and the upper lid of the coin cell was placed thereon with a gasket interpolated therebetween, and the lid was caulked by using a caulking machine, so that a nonaqueous electrolyte secondary battery (coin-shaped battery R2032) was manufactured. The assembling processes of the battery were carried out in a glove box in an argon atmosphere.

(2-2) Charging/Discharging Tests

By using the above-mentioned coin-shaped battery, charging/discharging tests were carried out under the following conditions.

<Charging/Discharging Tests>
Test temperature: 25° C.
Charging maximum voltage: 4.3 V
Charging time: 8 hours
Charging current: 0.2 mA/cm$^2$
Discharging minimum voltage: 2.5 V
Constant current discharging
Discharging current: 0.2 mA/cm$^2$ (3-1) Manufacture of Coin Cell for Cycling Test A mixed solvent of DMC:EMC=50:50 (volume ratio) was used as a solvent for an electrolytic solution. LiPF$_6$ was used as an electrolyte. The electrolyte was dissolved in the mixed solvent at a rate of 1 mole/liter so that an electrolytic solution 2 was prepared. The same manner as in (2-1) was carried out except that the electrolytic solution 2 was used in place of the electrolytic solution 1 so that a coin cell for a cycling test was prepared.

(3-2) Cycling Test

By using the coin cell for a cycling test, cycling tests were carried out under the following conditions so that a discharge capacity maintaining rate at 60° C. was determined.

<Cycling Tests>
Test temperature: 60° C.
Charging maximum voltage: 4.3 V
Charging time: 8 hours
Charging current: 0.2 mA/cm$^2$
Discharging minimum voltage: 2.5 V
Constant current discharging
Discharging current: 0.2 mA/cm$^2$
Number of cycles: 50 times <Discharge Capacity Maintaining Rate at 60° C.>

Discharge capacity maintaining rate at 60° C.
(%)=Charging capacity at 50th cycle/Charging capacity at 1st cycle×100

(4) Evaluation of Positive Electrode Active Material

1. Composition Analysis of Lithium Mixed Metal Oxide

After dissolving a lithium mixed metal oxide in hydrochloric acid, by using the resulting aqueous solution, the composition of the lithium mixed metal oxide was determined by using inductively coupled plasma atomic emission spectroscopy (SPS3000, hereinafter, sometimes referred to as ICP-AES).

2. Measurements of Average Particle Diameter of Lithium Mixed Metal Oxide

The average particle diameter of the lithium mixed metal oxide ($D_{50}$) was measured by using the following method. To 50 ml of ion-exchange water was put 0.1 g of a lithium mixed metal oxide in the form of particles, and this was irradiated with ultrasonic waves for two minutes by using an ultrasonic wave generator (SONIFIER 450) so that a dispersion solution of the lithium mixed metal oxide was obtained. By using the resulting dispersion solution, the $D_{50}$ (μm) of the lithium mixed metal oxide was determined by a laser diffraction scattering particle-size distribution measurement using a laser diffraction scattering particle-size distribution measuring device (Mastersizer 2000).

Comparative Example 1

1. Production of Lithium Mixed Metal Oxide

A nickel chloride (II) hexahydrate and a manganese chloride (II) tetrahydrate were precisely weighed so as to have a mole ratio of Ni:Mn of 0.50:0.50, and these were added to ion-exchange water, and dissolved by stirring so that an aqueous nickel-manganese mixed solution was obtained. An aqueous potassium hydroxide solution (with a pH value of 14) was prepared separately, and to this was dropwise added the aqueous nickel-manganese mixed solution while being stirred so that a coprecipitate was generated, and a coprecipitate slurry was obtained. The pH of the coprecipitate slurry was 13.

Next, the coprecipitate slurry was filtered, and washed with distilled water, and the resulting solid matter was dried at 100° C. so that a coprecipitate P$_1$ (hydroxide containing Ni and Mn) was obtained. The coprecipitate P$_1$, a lithium hydroxide monohydrate and potassium chloride (inactive flux) were mixed in a dry manner by using an agate mortar to obtain a mixture. The mixture was put into a calcination container made of alumina, and kept at 800° C. for 6 hours in the atmosphere by using an electric furnace so that the mixture was calcined, and by cooling this down to room temperature, a calcined product was obtained. A pulverized product obtained by pulverizing the calcined product was washed with distilled water by using a decantation method, and filtered to obtain a solid matter, and the solid matter was dried at 100° C. so that a powder A$_1$ was obtained.

As a result of the composition analysis of the powder A$_1$, the mole ratio of Li:Ni:Mn was 1.10:0.50:0.50. The average particle diameter of the powder A$_1$ was 0.30 μm.

2. Charging/Discharging Tests of Nonaqueous Electrolyte Secondary Battery

By using the powder A$_1$ as a positive electrode active material, a coin-shaped battery was manufactured, and subjected to charging/discharging tests, and the resulting discharge capacity was 145 mAh/g, which was a low value. Moreover, by using the powder A$_1$ as a positive electrode active material, a coin-shaped battery for cycling tests was manufactured, and subjected to cycling tests, and the resulting value at the 1st cycle was 158 mAh/g, and the resulting value at the 50th cycle was 115 mAh/g, with a discharge capacity maintaining rate (%) being 73, both of which were low values.

Example 1

1. Production of Lithium Mixed Metal Oxide

A nickel chloride (II) hexahydrate, a manganese chloride (II) tetrahydrate and a iron chloride (II) tetrahydrate were precisely weighed so as to have a mole ratio of Ni:Mn:Fe of 0.55:0.40:0.05, and these were added to ion-exchange water, and dissolved by stirring so that an aqueous nickel-manganese-iron mixed solution was obtained. An aqueous potassium hydroxide solution (with a pH value of 14) was prepared separately, and to this was dropwise added the aqueous nickel-manganese-iron mixed solution while being stirred so that a coprecipitate was generated, and a coprecipitate slurry was obtained. The pH of the coprecipitate slurry was 13.

Next, the coprecipitate slurry was filtered, and washed with distilled water, and the resulting solid matter was dried at 100° C. so that a coprecipitate Q$_1$ (hydroxide containing Ni, Mn and Fe) was obtained. The coprecipitate Q$_1$, lithium carbonate and potassium carbonate (inactive flux) were mixed in a dry manner by using an agate mortar to obtain a mixture. The mixture was put into a calcination container made of alumina, and kept at 850° C. for 6 hours in the atmosphere by using an electric furnace so that the mixture was calcined, and by cooling this down to room temperature, a calcined product was obtained. A pulverized product obtained by pulverizing the calcined product was washed with distilled water by using a decantation method, and filtered to obtain a solid matter, and the solid matter was dried at 100° C. so that a powder $B_1$ was obtained.

As a result of the composition analysis of the powder $B_1$, the mole ratio of Li:Ni:Mn:Fe was 1.08:0.55:0.40:0.05. The average particle diameter of the powder $B_1$ was 0.18 μm.

2. Charging/Discharging Tests of Nonaqueous Electrolyte Secondary Battery

By using the powder $B_1$ as a positive electrode active material, a coin-shaped battery was manufactured, and subjected to charging/discharging tests, and it was found that the resulting discharge capacity was 152 mAh/g, which was larger capacity in comparison with the case using the powder $A_1$. Moreover, by using the powder $B_1$ as a positive electrode active material, a coin-shaped battery for cycling tests was manufactured, and subjected to cycling tests, and the resulting value at the 1st cycle was 166 mAh/g, and the resulting value at the 50th cycle was 146 mAh/g, with a discharge capacity maintaining rate (%) being 88, both of which were high values.

Example 2

1. Production of Lithium Mixed Metal Oxide

The same operations as in Example 1 were carried out except that the mole ratio of Ni:Mn:Fe was set to 0.55:0.425:0.025 so that a powder $B_2$ was obtained.

As a result of the composition analysis of the powder $B_2$, the mole ratio of Li:Ni:Mn:Fe was 1.06:0.55:0.425:0.025. The average particle diameter of the powder $B_2$ was 0.18 μm.

2. Charging/Discharging Tests of Nonaqueous Electrolyte Secondary Battery

By using the powder $B_2$ as a positive electrode active material, a coin-shaped battery was manufactured, and subjected to charging/discharging tests, and it was found that the resulting discharge capacity was 153 mAh/g, which was larger capacity in comparison with the case using the powder $A_1$. Moreover, by using the powder $B_2$ as a positive electrode active material, a coin-shaped battery for cycling tests was manufactured, and subjected to cycling tests, and the resulting value at the 1st cycle was 167 mAh/g, and the resulting value at the 50th cycle was 143 mAh/g, with a discharge capacity maintaining rate (%) being 86, both of which were high values.

Example 3

1. Production of Lithium Mixed Metal Oxide

The same operations as in Example 1 were carried out except that the mole ratio of Ni:Mn:Fe was set to 0.56:0.41:0.03 so that a powder $B_3$ was obtained.

As a result of the composition analysis of the powder $B_3$, the mole ratio of Li:Ni:Mn:Fe was 1.10:0.56:0.41:0.03. The average particle diameter of the powder $B_3$ was 0.18 μm.

2. Charging/Discharging Tests of Nonaqueous Electrolyte Secondary Battery

By using the powder $B_3$ as a positive electrode active material, a coin-shaped battery was manufactured, and subjected to charging/discharging tests, and it was found that the resulting discharge capacity was 155 mAh/g, which was larger capacity in comparison with the case using the powder $A_1$. Moreover, by using the powder $B_3$ as a positive electrode active material, a coin-shaped battery for cycling tests was manufactured, and subjected to cycling tests, and the resulting value at the 1st cycle was 167 mAh/g, and the resulting value at the 50th cycle was 150 mAh/g, with a discharge capacity maintaining rate (%) being 90, both of which were high values.

Example 4

1. Production of Lithium Mixed Metal Oxide

The same operations as in Example 1 were carried out except that the mole ratio of Ni:Mn:Fe was set to 0.56:0.42:0.02 so that a powder $B_4$ was obtained.

As a result of the composition analysis of the powder $B_4$, the mole ratio of Li:Ni:Mn:Fe was 1.12:0.56:0.42:0.02. The average particle diameter of the powder $B_4$ was 0.22 μm.

2. Charging/Discharging Tests of Nonaqueous Electrolyte Secondary Battery

By using the powder $B_4$ as a positive electrode active material, a coin-shaped battery was manufactured, and subjected to charging/discharging tests, and it was found that the resulting discharge capacity was 151 mAh/g, which was larger capacity in comparison with the case using the powder $A_1$. Moreover, by using the powder $B_3$ as a positive electrode active material, a coin-shaped battery for cycling tests was manufactured, and subjected to cycling tests, and the resulting value at the 1st cycle was 165 mAh/g, and the resulting value at the 50th cycle was 146 mAh/g, with a discharge capacity maintaining rate (%) being 88, both of which were high values.

Comparative Example 2

1. Production of Lithium Mixed Metal Oxide

The same operations as in Example 1 were carried out except that the mole ratio of Ni:Mn:Fe was set to 0.75:0.20:0.05 so that a powder $A_2$ was obtained.

As a result of the composition analysis of the powder $A_2$, the mole ratio of Li:Ni:Mn:Fe was 1.05:0.75:0.20:0.05. The average particle diameter of the powder $A_2$ was 0.50 μm.

2. Charging/Discharging Tests of Nonaqueous Electrolyte Secondary Battery

By using the powder $A_2$ as a positive electrode active material, a coin-shaped battery was manufactured, and subjected to charging/discharging tests, and the resulting discharge capacity was 149 mAh/g, which was a low value. Moreover, by using the powder $A_2$ as a positive electrode active material, a coin-shaped battery for cycling tests was manufactured, and subjected to cycling tests, and the resulting value at the 1st cycle was 175 mAh/g, and the resulting value at the 50th cycle was 123 mAh/g, with a discharge capacity maintaining rate (%) being 70, both of which were low values.

Comparative Example 3

1. Production of Lithium Mixed Metal Oxide

The same operations as in Example 1 were carried out except that the mole ratio of Ni:Mn:Fe was set to 0.45:0.45:0.10 and that the calcination temperature was 800° C. so that a powder $A_3$ was obtained.

As a result of the composition analysis of the powder $A_3$, the mole ratio of Li:Ni:Mn:Fe was 1.11:0.45:0.45:0.10. The average particle diameter of the powder $A_3$ was 0.21 μm.

2. Charging/Discharging Tests of Nonaqueous Electrolyte Secondary Battery

By using the powder $A_3$ as a positive electrode active material, a coin-shaped battery was manufactured, and subjected to charging/discharging tests, and the resulting discharge capacity was 130 mAh/g, which was a low value. Moreover, by using the powder $A_3$ as a positive electrode active material, a coin-shaped battery for cycling tests was manufactured, and subjected to cycling tests, and the resulting value at the 1st cycle was 144 mAh/g, and the resulting value at the 50th cycle was 130 mAh/g, with a discharge capacity maintaining rate (%) being 90, both the discharging capacities were low values.

Comparative Example 4

1. Production of Lithium Mixed Metal Oxide

The same operations as in Comparative Example 1 were carried out except that the mole ratio of Ni:Mn was set to 0.70:0.30 so that a powder $A_4$ was obtained.

As a result of the composition analysis of the powder $A_4$, the mole ratio of Li:Ni:Mn was 1.09:0.70:0.30. The average particle diameter of the powder $A_4$ was 0.24 μm.

2. Charging/Discharging Tests of Nonaqueous Electrolyte Secondary Battery

By using the powder $A_4$ as a positive electrode active material, a coin-shaped battery was manufactured, and subjected to charging/discharging tests, and the resulting discharge capacity was 91 mAh/g, which was a low value. Moreover, by using the powder $A_4$ as a positive electrode active material, a coin-shaped battery for cycling tests was manufactured, and subjected to cycling tests, and the resulting value at the 1st cycle was 147 mAh/g, and the resulting value at the 50th cycle was 28 mAh/g, with a discharge capacity maintaining rate (%) being 19, both of which were low values.

Example 5

1. Production of Lithium Mixed Metal Oxide

The same operations as in Example 1 were carried out except that the mole ratio of Ni:Mn:Fe was set to 0.51:0.44:0.05 and that the calcination temperature was 870° C. so that a powder $B_5$ was obtained.

As a result of the composition analysis of the powder $B_5$, the mole ratio of Li:Ni:Mn:Fe was 1.10:0.51:0.44:0.05. The average particle diameter of the powder $B_5$ was 0.34 μm.

2. Charging/Discharging Tests of Nonaqueous Electrolyte Secondary Battery

By using the powder $B_5$ as a positive electrode active material, a coin-shaped battery was manufactured, and subjected to charging/discharging tests, and it was found that the resulting discharge capacity was 151 mAh/g, which was large capacity. Moreover, by using the powder $B_5$ as a positive electrode active material, a coin cell for cycling tests was manufactured, and subjected to cycling tests, and the resulting value at the 1st cycle was 163 mAh/g, and the resulting value at the 50th cycle was 150 mAh/g, with a discharge capacity maintaining rate (%) being 92, both of which were high values.

Example 6

1. Production of Lithium Mixed Metal Oxide

The same operations as in Example 5 were carried out except that the mole ratio of Ni:Mn:Fe was set to 0.53:0.42:0.05 so that a powder $B_6$ was obtained.

As a result of the composition analysis of the powder $B_6$, the mole ratio of Li:Ni:Mn:Fe was 1.09:0.53:0.42:0.05. The average particle diameter of the powder $B_6$ was 0.33 μm.

2. Charging/Discharging Tests of Nonaqueous Electrolyte Secondary Battery

By using the powder $B_6$ as a positive electrode active material, a coin-shaped battery was manufactured, and subjected to charging/discharging tests, and it was found that the resulting discharge capacity was 151 mAh/g, which was large capacity. Moreover, by using the powder $B_6$ as a positive electrode active material, a coin cell for cycling tests was manufactured, and subjected to cycling tests, and the resulting value at the 1st cycle was 165 mAh/g, and the resulting value at the 50th cycle was 149 mAh/g, with a discharge capacity maintaining rate (%) being 90, both of which were high values.

Example 7

1. Production of Lithium Mixed Metal Oxide

The same operations as in Example 5 were carried out except that the mole ratio of Ni:Mn:Fe was set to 0.55:0.40:0.05 so that a powder $B_7$ was obtained.

As a result of the composition analysis of the powder $B_7$, the mole ratio of Li:Ni:Mn:Fe was 1.06:0.55:0.40:0.05. The average particle diameter of the powder $B_7$ was 0.36 μm.

2. Charging/Discharging Tests of Nonaqueous Electrolyte Secondary Battery

By using the powder $B_7$ as a positive electrode active material, a coin-shaped battery was manufactured, and subjected to charging/discharging tests, and it was found that the resulting discharge capacity was 152 mAh/g, which was large capacity. Moreover, by using the powder $B_7$ as a positive electrode active material, a coin cell for cycling tests was manufactured, and subjected to cycling tests, and the resulting value at the 1st cycle was 168 mAh/g, and the resulting value at the 50th cycle was 149 mAh/g, with a discharge capacity maintaining rate (%) being 89, both of which were high values.

Example 8

1. Production of Lithium Mixed Metal Oxide

The same operations as in Example 5 were carried out except that the calcination temperature was 750° C. so that a powder $B_8$ was obtained.

As a result of the composition analysis of the powder $B_8$, the mole ratio of Li:Ni:Mn:Fe was 1.10:0.51:0.44:0.05. The average particle diameter of the powder $B_8$ was 0.17 μm.

2. Charging/Discharging Tests of Nonaqueous Electrolyte Secondary Battery

By using the powder $B_8$ as a positive electrode active material, a coin-shaped battery was manufactured, and subjected to charging/discharging tests, and it was found that the resulting discharge capacity was 150 mAh/g, which was large capacity. Moreover, by using the powder $B_8$ as a positive electrode active material, a coin cell for cycling tests was manufactured, and subjected to cycling tests, and the resulting value at the 1st cycle was 162 mAh/g, and the resulting value at the 50th cycle was 147 mAh/g, with a discharge capacity maintaining rate (%) being 91, both of which were high values.

Example 9

1. Production of Lithium Mixed Metal Oxide

The same operations as in Example 7 were carried out except that the calcination temperature was 750° C. so that a powder $B_9$ was obtained.

As a result of the composition analysis of the powder $B_9$, the mole ratio of Li:Ni:Mn:Fe was 1.11:0.55:0.40:0.05. The average particle diameter of the powder $B_9$ was 0.18 μm.

2. Charging/Discharging Tests of Nonaqueous Electrolyte Secondary Battery

By using the powder $B_9$ as a positive electrode active material, a coin-shaped battery was manufactured, and subjected to charging/discharging tests, and it was found that the resulting discharge capacity was 150 mAh/g, which was large capacity. Moreover, by using the powder $B_9$ as a positive electrode active material, a coin cell for cycling tests was manufactured, and subjected to cycling tests, and the resulting value at the 1st cycle was 167 mAh/g, and the resulting value at the 50th cycle was 146 mAh/g, with a discharge capacity maintaining rate (%) being 87, both of which were high values.

Example 10

1. Production of Lithium Mixed Metal Oxide

The same operations as in Example 1 were carried out except that the mole ratio of Ni:Mn:Fe was set to 0.60:0.35:0.05 so that a powder $B_{10}$ was obtained.

As a result of the composition analysis of the powder $B_{10}$, the mole ratio of Li:Ni:Mn:Fe was 1.09:0.60:0.35:0.05. The average particle diameter of the powder $B_{10}$ was 0.23 μm.

2. Charging/Discharging Tests of Nonaqueous Electrolyte Secondary Battery

By using the powder $B_{10}$ as a positive electrode active material, a coin-shaped battery was manufactured, and subjected to charging/discharging tests, and it was found that the resulting discharge capacity was 158 mAh/g, which was large capacity. Moreover, by using the powder $B_{10}$ as a positive electrode active material, a coin cell for cycling tests was manufactured, and subjected to cycling tests, and the resulting value at the 1st cycle was 166 mAh/g, and the resulting value at the 50th cycle was 141 mAh/g, with a discharge capacity maintaining rate (%) being 85, both of which were high values.

Table 1 shows the summary of preparations of the lithium mixed metal oxides of the examples and comparative examples.

TABLE 1

| | Mole ratio | | | | Calcination conditions | Average particle diameter μm |
|---|---|---|---|---|---|---|
| | Li x | Ni y | Mn 1 − (y + z) | Fe z | Temperature*Time ° C. *hours | |
| Example 1 | 1.08 | 0.55 | 0.40 | 0.05 | 850*6 | 0.18 |
| Example 2 | 1.06 | 0.55 | 0.425 | 0.025 | 850*6 | 0.18 |
| Example 3 | 1.10 | 0.56 | 0.41 | 0.03 | 850*6 | 0.18 |
| Example 4 | 1.12 | 0.56 | 0.42 | 0.02 | 850*6 | 0.22 |
| Example 5 | 1.10 | 0.51 | 0.44 | 0.05 | 870*6 | 0.34 |
| Example 6 | 1.09 | 0.53 | 0.42 | 0.05 | 870*6 | 0.33 |
| Example 7 | 1.06 | 0.55 | 0.40 | 0.05 | 870*6 | 0.36 |
| Example 8 | 1.10 | 0.51 | 0.44 | 0.05 | 750*6 | 0.17 |
| Example 9 | 1.11 | 0.55 | 0.40 | 0.05 | 750*6 | 0.18 |
| Example 10 | 1.09 | 0.60 | 0.35 | 0.05 | 850*6 | 0.23 |
| Comparative Example 1 | 1.10 | 0.50 | 0.50 | 0 | 800*6 | 0.30 |
| Comparative Example 2 | 1.05 | 0.75 | 0.20 | 0.05 | 850*6 | 0.50 |
| Comparative Example 3 | 1.11 | 0.45 | 0.45 | 0.10 | 800*6 | 0.21 |
| Comparative Example 4 | 1.09 | 0.70 | 0.30 | 0 | 800*6 | 0.24 |

Table 2 shows the summary of evaluation results of the nonaqueous secondary batteries of the examples and comparative examples.

TABLE 2

| | Charging/discharging test (25° C.) Discharge capacity (1st) mAh/g | Cycling test (60° C.) | | |
|---|---|---|---|---|
| | | Discharge capacity (1st) mAh/g | Discharge capacity (50th) mAh/g | Discharge capacity (50th)/Discharge capacity (1st) % |
| Example 1 | 152 | 166 | 146 | 88 |
| Example 2 | 153 | 167 | 143 | 86 |
| Example 3 | 155 | 167 | 150 | 90 |
| Example 4 | 151 | 165 | 146 | 88 |
| Example 5 | 151 | 163 | 150 | 92 |
| Example 6 | 151 | 165 | 149 | 90 |
| Example 7 | 152 | 168 | 149 | 89 |
| Example 8 | 150 | 162 | 147 | 91 |
| Example 9 | 150 | 167 | 146 | 87 |
| Example 10 | 158 | 166 | 141 | 85 |
| Comparative Example 1 | 145 | 158 | 115 | 73 |
| Comparative Example 2 | 149 | 175 | 123 | 70 |
| Comparative Example 3 | 130 | 144 | 130 | 90 |
| Comparative Example 4 | 91 | 147 | 28 | 19 |

Production Example 1

Production of Laminated Film (1) Production of Coating Slurry

After 272.7 g of calcium chloride had been dissolved in 4200 g of NMP, to this was added 132.9 g of paraphenylene diamine and completely dissolved therein. To the resultant solution was gradually added 243.3 g of terephthaloyl dichloride to be polymerized so that para-aramide was obtained, and this was further diluted with NMP so that a para-aramide solution (A) having a concentration of 2.0% by weight was obtained. To the resultant para-aramide solution (100 g) were added 2 g of an alumina powder (a) (alumina C, manufactured by Japan Aerosil Inc., average particle diameter: 0.02 μm) and 2 g of an alumina powder (b) (Sumicorundum AA03, manufactured by Sumitomo Chemical Co., Ltd., average particle diameter: 0.3 μm), that is, the total of 4 g, and mixed therein as fillers, and this was processed by a nano-mizer three times, and further filtered by a wire gauze with 1-000 meshes, and then defoamed under reduced pressure so that a coating slurry (B) was produced. The weight of the alumina powder (filler) relative to the total weight of the paraamide and the alumina powder was 67% by weight.

(2) Production and Evaluations of Laminated Film

As a porous film, a polyethylene porous film (film thickness: 12 μm, gas permeability: 140 seconds/100 ccs, average pore diameter: 0.1 μm, rate of porosity: 50%) was used. The polyethylene porous film was secured onto a PET film having a thickness of 100 μm, and the coating slurry (B) was applied onto the porous film by using a bar coater manufactured by Tester Sangyo Co., Ltd. The PET film and the coated porous film were immersed into water while being integrally kept so that a para-aramide porous film (heat resistant layer) was deposited thereon, and the solvent was then dried so that a laminated film 1 having the heat resistant porous layer and the porous film stacked thereon was obtained. The thickness of the laminated film 1 was 16 μm, and the thickness of the paraamide porous film (heat resistant porous layer) was 4 μm. The gas permeability of the laminated film 1 was 180 seconds/100 ccs, and the rate of porosity thereof was 50%. When the cross section of the heat resistant porous layer in the laminated film 1 was observed by a scanning electron microscope (SEM), it was found that comparatively small fine pores in a range from about 0.03 μm to 0.06 μm and comparatively large fine pores in a range from about 0.1 μm to 1 μm were present. The evaluations on the laminated film were carried out by the following method.

<Evaluations of Laminated Film>

(A) Thickness Measurements

The thickness of the laminated film and the thickness of the porous film were measured in accordance with JIS Standard (K7130-1992). Moreover, a value obtained by subtracting the thickness of the porous film from the thickness of the laminated film was used as the thickness of the heat resistant porous layer.

(B) Measurements of Gas Permeability by Gurley Method

The gas permeability of the laminated film was measured in accordance with JIS P8117 by using a digital timer-type Gurley type Densometer manufactured by Yasuda Seiki Seisakusho Ltd.

(C) Rate of Porosity

The sample of the resulting laminated film was cut out into a square having a length of 10 cm in each side, and the weight W(g) and the thickness D (cm) were measured. The weights of the respective layers in the sample (Wi(g); i is an integer from 1 to n) were obtained, and based upon Wi and the true specific gravity (true specific gravity i ($g/cm^3$)) of the material of each layer, the volume of each of the layers was obtained, and the rate of porosity (volume %) was calculated from the following expression:

Rate of Porosity (volume %)=100×{1−($W1$/True Specific Gravity 1+$W2$/True Specific Gravity 2+ . . . +$Wn$/True Specific Gravity n)/(10× 10×$D$)}

In each of the examples, by using the laminated film obtained from Production Example 1, a lithium secondary battery capable of increasing the thermal film-rupturing temperature can be obtained.

INDUSTRIAL APPLICABILITY

The present invention makes it possible to provide a nonaqueous electrolyte secondary battery having higher discharge capacity in comparison with the conventional lithium secondary battery. The secondary battery is superior in cycling characteristic, and provides a high output with a high electric current rate. The present invention is effectively used for applications in which a high output with a high electric current rate is required, that is, for a nonaqueous electrolyte secondary battery for use in automobiles and power tools such as electric tools.

The invention claimed is:

1. A lithium mixed metal oxide represented by the following formula (A):

$$Li_x(Mn_{1-(y+z)}Ni_yFe_z)O_2 \qquad (A)$$

wherein x is not less than 0.9 and not more than 1.3, y is not less than 0.52 and not more than 0.58, and z is more than 0 and not more than 0.1, and said lithium mixed metal oxide having an average primary particle diameter of not less than 0.01 μm and not more than 0.5 μm, and said lithium mixed metal oxide having a BET specific surface area of not less than 3 $m^2/g$ and not more than 20 $m^2/g$, and wherein the lithium mixed metal oxide is in the form of particles, and the average particle diameter of all the particles is not less than 0.01 μm and not more than 1 μm.

2. The lithium mixed metal oxide according to claim 1, wherein z is not less than 0.02 and not more than 0.07.

3. An electrode comprising the lithium mixed metal oxide according to claim 1.

4. A nonaqueous electrolyte secondary battery comprising the electrode according to claim 3 as a positive electrode.

5. The nonaqueous electrolyte secondary battery according to claim 4, further comprising a separator.

6. The nonaqueous electrolyte secondary battery according to claim 5, wherein the separator is composed of a laminated film in which a heat resistant porous layer and a porous film are stacked on each other.

* * * * *